United States Patent [19]

Suzuki et al.

[11] Patent Number: 5,905,581
[45] Date of Patent: May 18, 1999

[54] IMAGE FORMING APPARATUS

[75] Inventors: Tadashi Suzuki; Isamu Sato, both of Yokohama; Masatoshi Tanabe, Chigasaki; Kazuhiko Hirooka, Tokyo; Yoshio Mizuno, Ichikawa; Yoshihiko Suzuki, Tokyo, all of Japan

[73] Assignee: Canon Kabushiki Kaisha, Tokyo, Japan

[21] Appl. No.: 08/258,369

[22] Filed: Jun. 10, 1994

Related U.S. Application Data

[63] Continuation of application No. 07/714,019, Jun. 12, 1991, abandoned.

[30] Foreign Application Priority Data

Jun. 15, 1990 [JP] Japan .................................. 2-155317

[51] Int. Cl.⁶ .................................................. H04N 1/32
[52] U.S. Cl. .......................... 358/468; 358/400; 358/403
[58] Field of Search .................................... 358/400, 401, 358/403, 434, 468; 355/200, 202, 203, 204

[56] References Cited

U.S. PATENT DOCUMENTS

| | | | |
|---|---|---|---|
| 4,248,528 | 2/1981 | Sahay | 355/203 |
| 4,970,554 | 11/1990 | Rourke | 355/200 |
| 4,987,447 | 1/1991 | Ojha | 355/204 |
| 5,161,037 | 11/1992 | Saito | 358/468 |

FOREIGN PATENT DOCUMENTS

| | | |
|---|---|---|
| 0096178 | 12/1983 | European Pat. Off. . |
| 0366425 | 5/1990 | European Pat. Off. . |
| 63-08889 | 1/1988 | Japan . |
| 2-104169 | 4/1990 | Japan . |

OTHER PUBLICATIONS

European Official Letter dated Oct. 8, 1996.

*Primary Examiner*—Thomas D. Lee
*Attorney, Agent, or Firm*—Fitzpatrick, Cella, Harper & Scinto

[57] ABSTRACT

There is disclosed an image forming apparatus, such as a copying machine, capable of various image forming modes. The image forming mode can be selected by feeding a mode registration format sheet into the apparatus. The format sheet can be a marking sheet, on which the operator can designate the desired image forming mode, and can be printed by the image forming apparatus itself in response to an instruction by the operator, so that the format sheet need not be prepared elsewhere in advance. Also the content of the format sheet, printed by the image forming apparatus, is varied according to the available copying modes, depending on the connection status of external processing units such as document feeder and sorter to the image forming apparatus.

51 Claims, 10 Drawing Sheets

IMAGE FORMING APPARATUS

This application is a continuation, of application Ser. No. 07/714,019 filed Jun. 12, 1991, now abandoned.

BACKGROUND OF THE INVENTION

1. Field of the Invention

The present invention relates to an image forming apparatus, such as a copying machine or a facsimile apparatus, capable of image forming in a desired image forming mode.

2. Related Background Art

Image forming apparatus such as a copying machine have recently entered the age of multiple functions, such as variable magnification, automatic density control, automatic sheet size selection, automatic magnification selection, multi-color, automatic two-side (both-side) image formation, image editing etc., and there is now a desired improvement in the operability, or development of novel function designating means in order to achieve optimum image formation, fully exploiting these various functions.

In such conventional apparatus, the users are often unable to fully utilize the functions provided therein, because a large number of selectable functions require complex methods and operations for the selection of such functions. Also, the number of operating buttons tend to increase with an increase in the number of selectable functions, but this fact becomes an obstacle in the compactization, simplification and cost reduction of the apparatus.

For this reason there has been proposed an image forming apparatus capable of automatically setting the image forming conditions by reading a special format sheet (for example marking sheet or mark sheet) in which the image forming conditions are marked in advance. Such apparatus allows a user to set the image forming conditions without complex key operations, so that the user can fully and easily exploit the various functions provided in the apparatus.

However, such setting of the image forming conditions will become unavailable in a case that special format sheet runs out or the user forgets to bring such sheet to the apparatus.

SUMMARY OF THE INVENTION

An object of the present invention is to provide an image forming apparatus capable of resolving the above-mentioned drawbacks.

Another object of the present invention is to provide an image forming apparatus enabling easy registration of image forming modes.

Still another object of the present invention is to provide an image forming apparatus which does not require preparation in advance of the format sheet, but can print a special format sheet, for data entry, when required.

Still another object of the present invention is to provide an image forming apparatus capable of printing a special format sheet, with a format corresponding to the image forming modes available in said apparatus.

Still another object of the present invention is to provide an image forming apparatus capable of printing a special format sheet, with a format corresponding to the connection state of an external processing apparatus connected to said image forming apparatus.

Still other objects of the present invention will become fully apparent from the following detailed description to be taken in conjunction with the attached drawings.

DETAILED DESCRIPTION OF THE PREFERRED EMBODIMENTS

The present invention will be clarified in detail by an embodiment thereof shown in the attached drawings.

Figure 2:
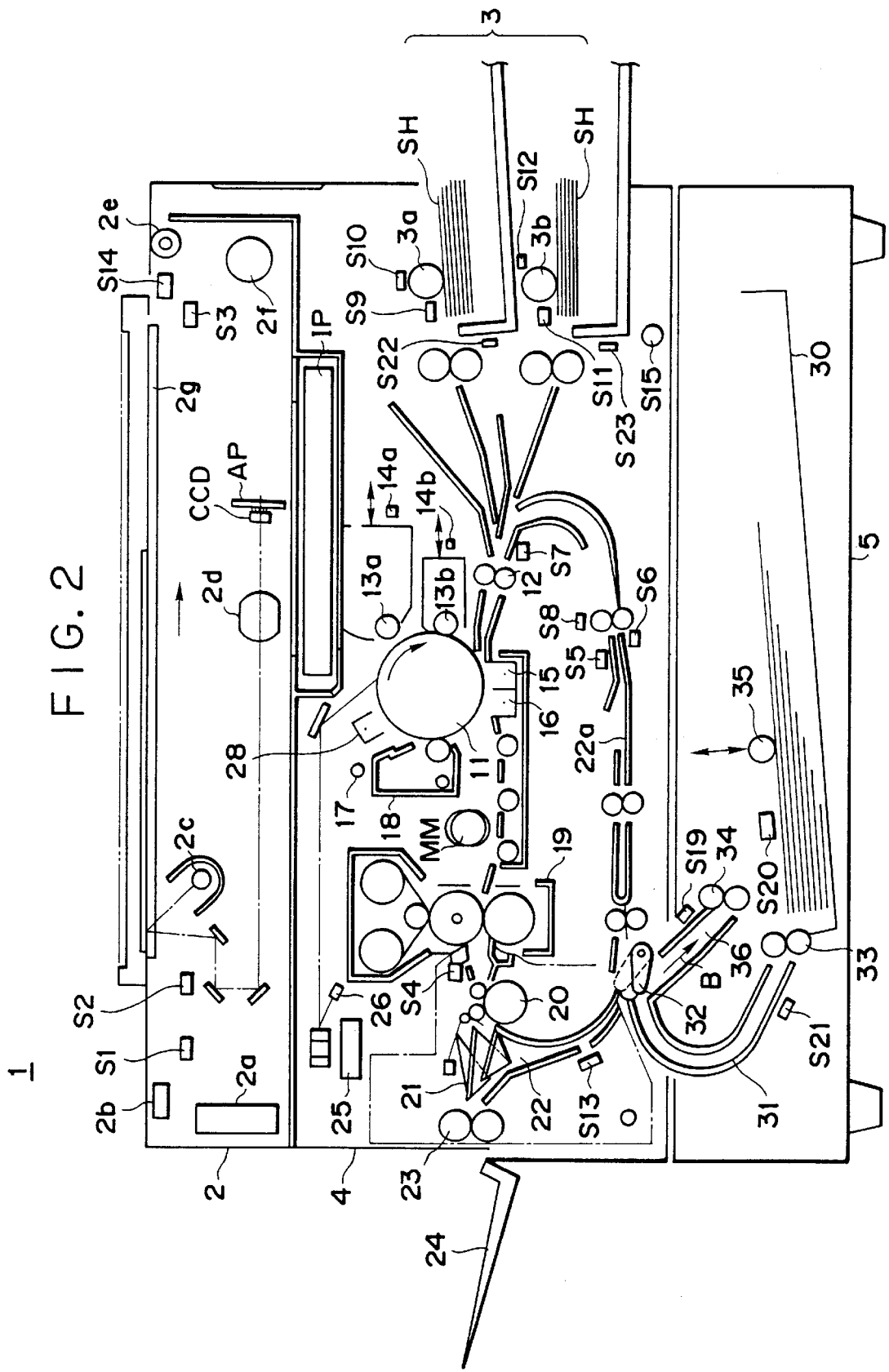
FIG. 2 is a schematic cross-sectional view of the internal structure of an embodiment of the image forming apparatus of the present invention.

FIG. 2 is a cross-sectional view of an image forming apparatus (copying machine) embodying the present invention, wherein a main unit 1 of the copying apparatus is composed of an original scanner unit 2, a sheet feeding unit 3, an image forming unit 4, an intermediate tray 5 etc.

At first there will be explained the structure of the original scanner unit 2.

A controller 2a is composed of a control board, in which a control device for integrally controlling the copying sequence is incorporated. Controller 2a is further provided with as two-side copying control means, digital information designating means, multiple copy control means etc.

Reference number 2b is a power switch. An original illuminating lamp 2c constitutes an optical scanning system, integral with a scanning mirror, and performs a scanning motion with a predetermined speed.

An imaging lens 2d focuses the light, reflected from an original, onto a charge-coupled device (CCD), which is a photoelectric converting device and converts the image information of the original into an electrical signal. An analog processor AP amplifies the electrical signal and performs A/D conversion thereof into a digital image signal. An image processing unit IP applies various image processings on the digital image signal, such as density conversion, area processing etc.

A buzzer 2e is used for giving an alarm for an error in the copying mode set by an operation unit to be explained later. An optical system driving motor 2f drives the optical scanning system etc. with a high precision. A platen glass 2g is provided for supporting the original document.

The following description explains the sheet feeding unit 3.

Sheet feeding rollers 3a, 3b are provided for feeding a cut sheet SH into the image forming unit 4.

The image forming unit 4, constituting image forming means, will be explained below in more detail.

Registration rollers 12 temporarily stop the cut sheet SH which has been fed by the sheet feeding rollers 3a, 3b, and feeds the sheet SH again after synchronization of the leading end of the sheet with that of the image.

Developing units 13a, 13b respectively contain developers of different colors (black and red). Either of said developing units 13a, 13b is positioned close to a photosensitive drum 13 while the other is retracted therefrom, by the energization of solenoids 14a, 14b. When a second recording mode is selected by an operation unit to be explained later, the controller 2a controls the solenoids 14a, 14b in such a manner that the development with red/black color is conducted solely on a recording material (cut sheet SH) corresponding to a particular original.

A transfer charger 15 causes the toner image, developed by the developing unit 13a or 13b, to be transferred onto the cut sheet SH. After said image transfer, the cut sheet SH is separated from the photosensitive drum 11 by a separating charger 16. A pre-exposure lamp 17 neutralizes the surface potential of the photosensitive drum 11, in preparation for the primary charging. A cleaner 18, consisting of a cleaning blade and a cleaning roller, serves to recover the toner remaining on the photosensitive drum 11.

A fixing unit 19 fixes the toner image, transferred onto the cut sheet SH, by heat and pressure. There are further provided a transport roller 20; a flapper 21 for guiding the cut sheet after the fixing process either toward discharge rollers 23 for toward an intermediate tray 5 through a transport path 22; and a sheet discharge tray 24.

A scanner motor 25 rotates a rotary polygon mirror at a predetermined velocity, thereby deflecting a laser beam emitted by a semiconductor laser 26. A digital scanning unit composed of the scanner motor 25, semiconductor laser 26 etc. emits a laser beam modulated corresponding to the image information processed in the image processing unit IP, thereby forming a latent image of the original image on the photosensitive drum 11. 28 indicates a primary charger.

The following description explains the structure of the intermediate tray unit 5 in greater detail.

An intermediate tray 30 temporarily stores the cut sheets SH, transported by a transport roller 34, and the stored sheets are again transported to the image forming unit 4 by feed rollers 33, 35 through a path 31.

In FIG. 2, there are shown various sensors S1–S15, S19–S23. For example the sensor S1 detects that the optical system, constituting an analog scanning unit, is at a home position. In the stand-by state, the optical system stops at the home position. The sensor S2 detects that the optical system has moved to a position corresponding to the leading end of the original image, and the timing of the copying sequence is controlled by the output signal of said sensor. The sensor S3 detects that the optical system has reached a limiter position (reversing position) at the maximum scanning. The optical system performs reciprocating motions with a scanning length according to a cassette size and an image magnification entered by the operation unit to be explained later.

The following the function of the entire apparatus in greater detail.

When the power switch 2b is turned on, at first a heater in the fixing unit 19 is activated, and the apparatus waits until the fixing roller reaches a predetermined temperature capable of fixing operation (waiting state).

When the fixing roller reaches the predetermined temperature, a main drive motor MM is activated for a predetermined period, thereby driving the photosensitive drum 11 and the fixing unit 19, and maintaining the roller of the fixing unit 19 in a uniform temperature state (waiting-released rotation state). Then the main motor MM is stopped, and the apparatus waits in a state capable of copying operation (stand-by state). The main motor MM serves to drive the photosensitive drum 11, fixing unit 19, developing units 13a, 13b and transport rollers.

A copying sequence is subsequently initiated in response to the entry of a copying instruction (copy start command) from the operation unit.

(1) Image formation

In response to the copying instruction, the main motor MM is activated to start the rotation of the photosensitive drum 11 in a direction of arrow in FIG. 2, and a high voltage is supplied from a high-voltage unit HTV to the primary charger 28 to uniformly charge the photosensitive drum 11. Then the original illuminating lamp 2c is turned on and the optical system motor 2f is activated to scan the original document, placed on the platen glass, in a direction indicated by an arrow in FIG. 2, by projecting the light, reflected from said original document, onto the photoelectric converting device (CCD). The image information of the original, converted into an electrical signal in the CCD, is converted into a digital image signal by the analog processor AP and the image processing unit IP. The semiconductor laser 26 is activated according to the processed image signal, and the photosensitive drum 11 is scanned with the laser beam deflected by the rotating polygon mirror, whereby a latent image corresponding to the original image is formed on the photosensitive drum 11.

Then, the latent image on the photosensitive drum 11 is developed with toner in the developing unit 11a or 11b. The developed toner image is transferred at the position of the transfer charger 15 onto the cut sheet SH, which is subsequently separated from the photosensitive drum 11 at the position of the separating charger 19.

The toner remaining on the photosensitive drum 11 is recovered by the cleaner 18, and the charge remaining on the drum is uniformly eliminated by the pre-exposure lamp 17. Subsequently the above-explained copying cycle is repeated.

Either one of the developing units 13a, 13b is brought into contact with the photosensitive drum 11, by a selecting instruction from the operation unit. In the present embodiment, the developing unit 13a contains colored toner (for example red-colored toner), while the other 13b contains black toner. The contact to and retraction from the drum 11 are controlled by the solenoids 14a, 14b. A developing bias voltage is given to the developing sleeves of said developing units 13a, 13b.

The copying machine of the present embodiment is capable not only of usual one-sided copying but also of two-sided (both-side) copying as well as multiple copying. As the cut sheet SH that has once passed the fixing unit 19 shows different properties, such as surface resistivity, in comparison with those at the copying on the first side, the high voltages supplied to the transfer charger 15 and the separating charger 16 are suitably varied for the first and second sides in the two-sided or multiple copying. The developing bias voltage, and the voltages for image transfer and sheet separation, are controlled by the high-voltage unit HVT.

(2) Control for cut sheet SH

Sensors S9, S11 in FIG. 2 respectively detect absence of sheet in upper and lower cassettes. Sensors S10, S12 detect the lifted state of the sheet feeding rollers 3a, 3b, respectively. Also Sensors S22, S23 detect the cassette size.

Since the upper and lower cassettes function in a similar manner, there will be explained the sheet feeding operation of the upper cassette in the following.

When the upper cassette is inserted, the cassette size is read by the sensor S22 and identified. Thus, in the operation unit 41, a no-sheet indicator is turned off, and a cassette size is selectively turned on.

Then, when a copying operation is started by the copying instruction, an inner plate elevating clutch (not shown) is energized to elevate an inner plate in the cassette, thereby lifting the cut sheets SH. When the sheets SH are lifted to a predetermined height in contact with the feed roller 3a, the sensor S10 releases a signal. In response the clutch is deactivated and the feed roller 3a is driven, thereby feeding a cut sheet SH into the apparatus.

The cut sheets SH in the cassette are elevated by the energization of the inner plate elevating clutch as explained above, then remain at the lifted state and the above-explained lifting operation is not conducted at the start of next copying operation. If the top level of the cut sheets SH becomes lower than a predetermined position in the course of a continuous copying operation, due to the decrease of the cut sheets, the output signal of the sensor S10 is turned off, whereby the clutch is energized again as explained above, thereby lifting the cut sheets SH to the predetermined height where the output signal of sensor S10 is again turned on.

The cut sheet SH, fed on by one into the apparatus, reaches the position of the sensor S7 and is stopped with a suitable loop formation, as the registration rollers 12 are stopped in this state.

Then the registration rollers 12 are activated in response to a timing signal from the optical system in such a manner as to register the leading end of said cut sheet SH with that of the toner image formed on the photosensitive drum 11, and said toner image is transferred onto the cut sheet SH by means of the transfer charger 15. Thereafter the cut sheet SH is separated from the drum 11 by means of the separating charger 16, and is forwarded by the transport mechanism to the fixing unit 19.

The surface of the fixing roller in the fixing unit 19 is controlled at a predetermined temperature, by means of the heater and a temperature sensor (not shown) provided on the surface. The cut sheet SH is subjected to the fixation of the toner image in the fixing unit 19, sensed by the sensor S4, and discharged from the apparatus by the discharge rollers 23.

In a multiple copying operation, the flapper 21 is switched by a solenoid (not shown) to the broken-lined position in FIG. 2. Thus the cut sheet SH, subjected to the sheet feeding, image transfer sheet separation and image fixation as explained above is transported in a direction 22a through a path 22, then detected by the sensors S5, S6, S8 etc. and laterally aligned by a lateral registration solenoid.

Then, in response to a multiple copying instruction from the operation unit, the feed roller is activated to advance the cut sheet SH to the registration rollers 12.

Thereafter, the cut sheet SH is subjected to the steps of sheet feeding, image transfer, sheet separation and images fixation as explained above, and is discharged onto the discharge sheet tray 24.

In a two-sided copying operation, the cut sheet SH is processed as in the ordinary copying operation until it is discharged by the discharge rollers 23, but, as the discharge rollers 23 are reversed immediately after the read end of the cut sheet SH passes through the flapper 21, whereby the cut sheet SH is guided by the flapper 21 into a path 22.

The reversing of the discharge rollers is achieved by a solenoid controlling the forward and reverse rotation. The subsequent operations are same as those in the multiple copying explained above. In case of the two-sided copying, as explained above, the cut sheet SH is mostly discharged from the apparatus through the discharge rollers 23 and then advanced in the direction 22a by the reversing of said discharge rollers 23, thereby being inverted.

In the foregoing there has been explained the multiple or two-sided copying on a single sheet, but, in such copying on plural sheets, the sheets are controlled through the intermediate tray unit 5. Such copying operations will be explained in the following.

As shown in FIG. 2, the intermediate tray unit 5 is provided with an intermediate tray 30 for temporarily storing the cut sheets SH on the transport path 31. In case of multiple copying on plural sheets, each cut sheet SH subjected to image fixation is once discharged through the discharge rollers 23 as in the single two-sided copying explained above, and is then stored in the intermediate tray 30 through the path 22, a flapper 32 and a path 36 by the reversing of the discharge rollers 23.

The above-explained operation is repeated until all the cut sheets SH, each bearing the first fixed image of multiple copying, are stored in the intermediate tray 30. Then, in response to a next copying instruction, the feed rollers 33 are activated to feed the cut sheet SH for the copying of the second image.

On the other hand, in case of two-sided copying on plural sheets, the cut sheets SH from the fixing unit 19 are stored in the intermediate tray 30, through the flapper 21, paths 22, 36 as in the multiple copying on a single sheet explained above.

An explanation of subsequent operations will not be repeated below since these steps are same as in the multiple copying explained above.

In a structure having an intermediate tray in the image forming unit 4, the temporarily stored sheets are limited in length. For example, in case the cut sheets SH are stacked like slates, only the half-sized or smaller sheets can be stored.

Figure 3:
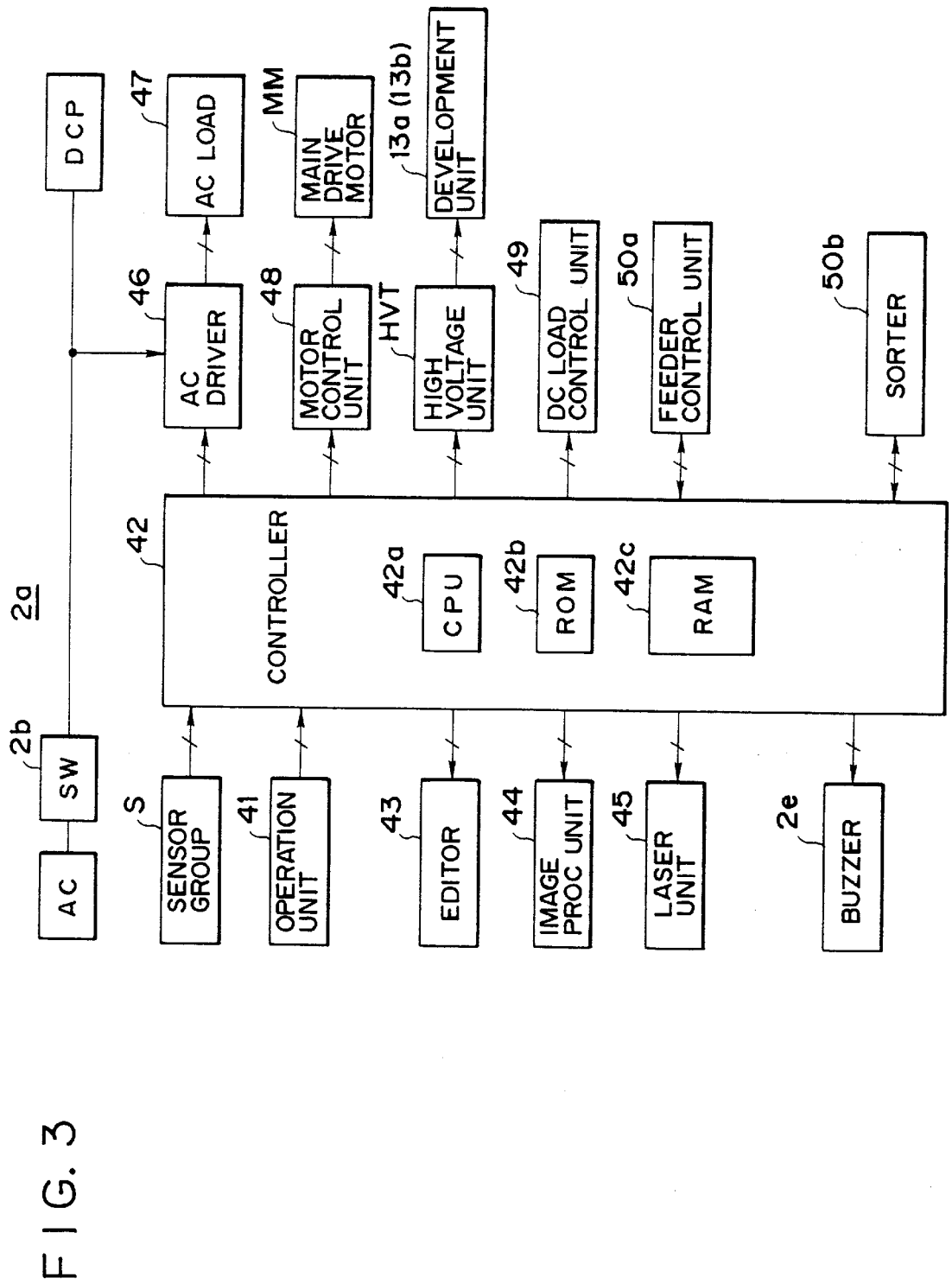
FIG. 3 is a block diagram of a controller 2a shown in FIG. 2.

FIG. 3 shows the circuit structure of the controller 2a shown in FIG. 2, wherein same components as those in FIG. 2 are represented by same symbols or numbers.

Referring to FIG. 3, an operation unit 41 is provided with a copy start key for entering the copy start instruction, copy number setting keys for setting the number of copies, sheet size setting keys for selecting the sheet size, magnification setting keys for selecting the image magnification in enlarged or reduced copying, a density setting key for selecting the copy density etc.

A controller 42, composed of a CPU 42a, a read-only memory (ROM) 42b, a random access memory (RAM) 42c, etc., and integrally controls the copying sequence according to a control program stored in the ROM 42b.

An editor 43 is used for entering data indicating a desired area of the original. An image processing unit 44 corresponds to IP in FIG. 2.

A laser unit 45 is composed of the semiconductor laser 26, the scanner motor 25 etc. An AC driver 46 supplies AC loads 47 such as the original illuminating lamp 2c with an AC electric power. A motor control unit 48 controls the motor unit. A DC load control unit 49 controls the solenoids 14a, 14b, clutches, fans etc.

A feeder control unit 50a controls an original document feeder. A sorter 50b sorts the cut sheet SH, discharged by the discharge rollers 23, into designated trays or bins.

A high-voltage unit HVT supplies the chargers and the developing sleeves of the developing units 13a, 13b with predetermined high voltages.

A DC power source DCP supplies the controller 2a etc. with a controlled voltage of +5 V.

Figure 4:
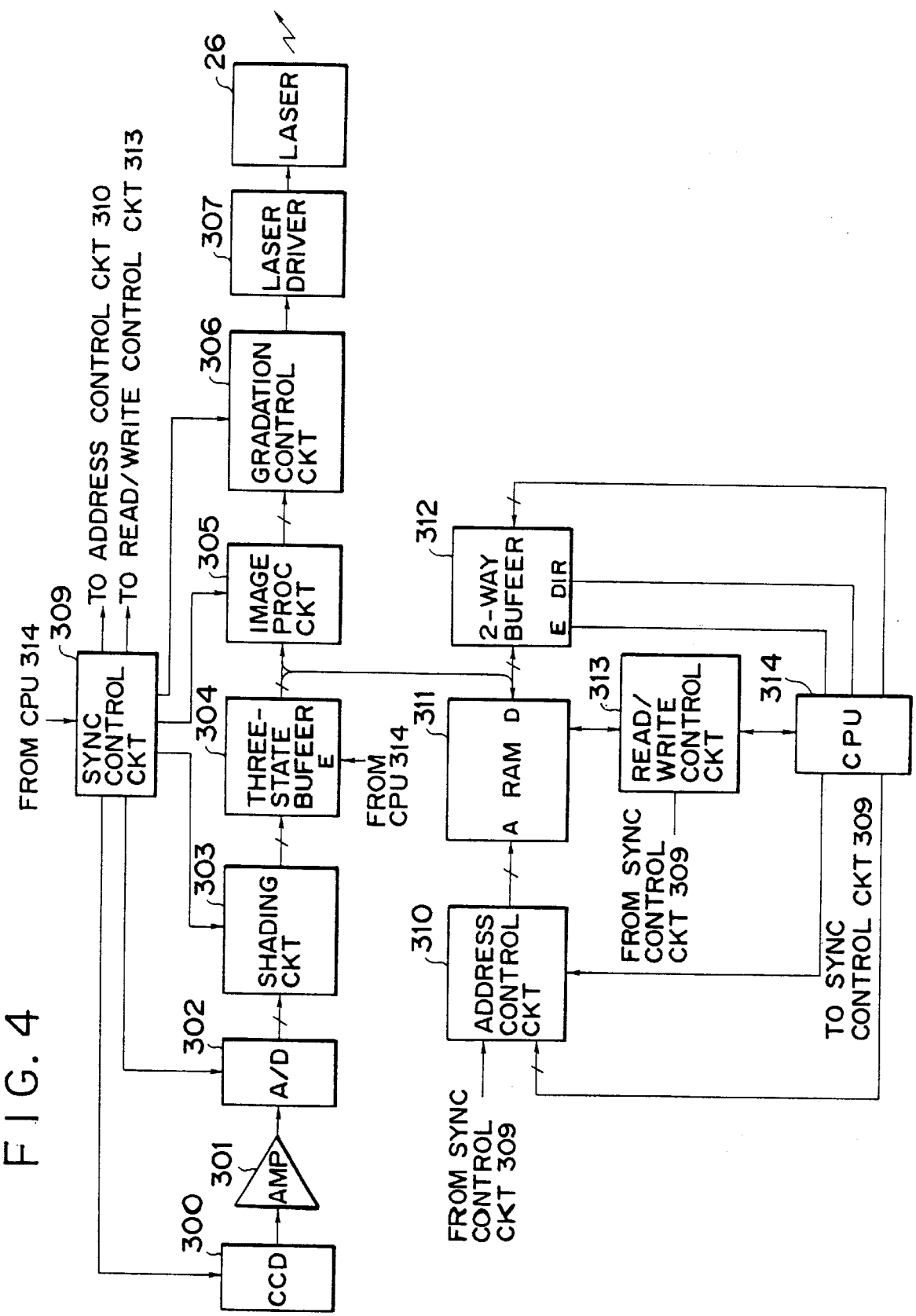
FIG. 4 is a block diagram of an image processing unit shown in FIG. 3.

FIG. 4 is a detailed block diagram of the image processing unit 44 shown in FIG. 3.

In the following there will be explained the function of the image processing unit 44 in (a) image output, (b) marking sheet reading and (c) marking sheet format output, which are related to the present invention. In FIG. 4, a CPU 314 and a RAM 311 may be exclusively designed devices different from those in the controller 42 in FIG. 3.

(a) Image output

As shown in FIG. 2, the light reflected from the original placed on the platen glass 2g is focused by the lens 2d onto a CCD line sensor 300. The charges accumulated for a predetermined time in the CCD line sensor 300 are simultaneously transferred, at a time for the entire line, to a shift register (not shown), and are released in succession as an image signal in response to shift clock signals from a synchronization control circuit 309.

The obtained image signal is supplied to an amplifier 301, which amplifies the image signal in such a manner that the output signal of the CCD line sensor upon reading a white board (not shown) provided in the original scanner unit 2 corresponds to the full scale of an A/D (analog-to-digital) converter 302.

A/D converter 302 converts the output signal of the amplifier 301 into 8-bit digital signals. A shading correction circuit 303 applies, to the digital signals, shading correction for the unevenness in the sensitivity of the CCD line sensor 300 and in the intensity of the illuminating lamp 2c. The output of the shading correction circuit 303 is supplied, through a three-state buffer 304, to an image processing circuit 305.

Image processing circuit 305 effects corrections such as density correction, and image editings such as image size change, image displacement and image trimming.

A gradation control circuit 306 effects binary digitizing of the image data supplied from the image processing circuit 305, utilizing for example a dither method based on a threshold value matrix or a density pattern method. Binary digitizing may also be achieved by pulse width modulation of the image data.

The output signal of the gradation control circuit 306 is supplied to a laser driver circuit 307, whereby the semiconductor laser 26 is activated according to the image signal. Thus a latent image is recorded on the photosensitive drum 11 according to the image signal, and a corresponding image is recorded on the cut sheet SH.

(b) Marking sheet reading

When a marking sheet is input, as will be explained later in relation to FIG. 5, the light reflected from the marking sheet, placed on the platen glass 2g, is also supplied to the CCD line sensor 300. The output signal thereof is amplified by the amplifier 301, then subjected to A/D conversion in the A/D converter 302 and shading correction in the shading correction circuit 303, and supplied to the three-state buffer 304. The output signal thereof is supplied to the image processing circuit 305 and also to a data bus of the RAM 311.

As the image formation is not required in the reading of the marking sheet, the image processing circuit 305 effects a switching operation in order that the image signal is supplied to the next gradation control circuit 306.

The CPU 314 causes an address control circuit 310 to generate address signals and a read/write control circuit 313 to generate write signals, thereby storing the image data, released from the three-state buffer 304, in the RAM 311 in succession.

In this operation, the CPU 314 controls the address signals from the address control circuit 310 and the write signals from the read/write control circuit 313, in synchronization with clock signals released from the synchronization control circuit 309.

Then the CPU 314 processes the data of the marking sheet as will be explained later, by reading the data stored in the RAM 311. In said reading operation, the address control circuit 310 and the read/write control circuit 313 respectively release address signals and read signals, and the CPU 314 controls a 2-way buffer 312 to connect the data buses on the RAM 311 and of the CPU 314. Also in the data reading operation of the CPU 314 from the RAM 311, the CPU 314 maintains the output of the three-state buffer at a high impedance.

(c) Output of marking sheet format

After maintaining the three-state buffer 304 at the high impedance state, the CPU 314 causes the address control circuit 310 and the read/write control circuit 313 to respectively release address signals and write signals. The CPU 314 also controls the 2-way buffer 312 to connect the data buses of the RAM 311 and of the CPU 314, thereby reading the data of the marking sheet format from the ROM 42b shown in FIG. 3 and storing said data in the RAM 311. Upon completion of said data storage, the CPU 314 causes, in synchronization with the clock signals from the synchronization control circuit 309, the address control circuit 310 to generate address signals and the read/write control circuit 313 to generate read signals, thereby sending said data from the RAM 311 to the image processing circuit 305. Said marking sheet format data are supplied, through the image processing circuit 305, to the gradation control circuit 306, and binary digitized therein. The binary digitized data are then supplied to the laser driver circuit 307 to activate the semiconductor laser 26, whereby a latent image is formed on the photosensitive drum corresponding to said data, and a marking sheet format, to be used in the present image forming apparatus, is recorded on a cut sheet SH.

Figure 5:
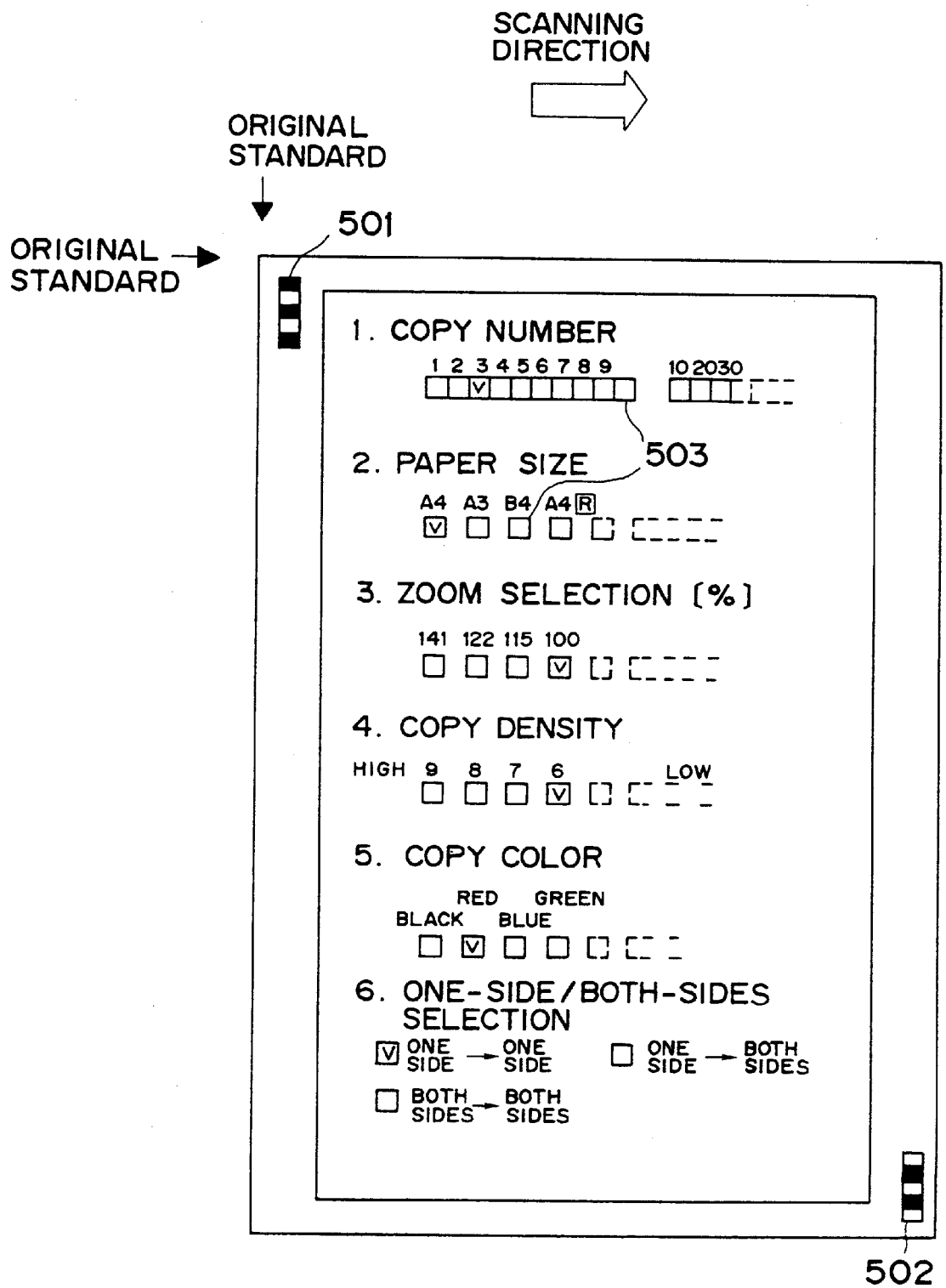
FIG. 5 is a plan view of an example of a marking format sheet to be employed in-an embodiment of the present invention.

FIG. 5 shows an example of the marking format sheet, to be used for the entry of the copying mode of the image forming apparatus 1.

The format sheet contains identification markers 501, 502, indicating that the sheet is a marking sheet, and a marking area 503 for selecting various copying modes. The marking sheet has a predetermined size, for example A4 size. The selection of copying mode may be made with a marking sheet printed elsewhere as conventionally done, or with a marking sheet printed, when required, by the picture unit of the image forming apparatus 1.

For identifying the marking sheet, mutually different markers 501, 502 are provided respectively at the upper left corner and the lower right corner of the format sheet, and are read as image data into the RAM 311 shown in FIG. 4, in a pre-scanning operation. If a part of the image data read by the CPU 314 is the identification marker, the CPU 42a identifies the original as a marking sheet, and reads the copying mode (cf. steps 404, 408 in FIG. 1). At the upper left corner and the lower right corner of the format sheet, there are respectively provided identification markers 501, 502 of mutually different patterns in order that the copying mode can be identified regardless of the direction of the marking sheet with respect to the standard position of the original on the platen glass 2g, and the CPU 42a identifies the reading direction of the image data of the marking sheet, based on said difference of the patterns.

The copying mode can be designated by making small squares in marking areas 503 for mode selection. Said marking may be a check mark "V" in the small square or may be blacking out of the small suare (☐). Thus, FIG. 5 illustrates as an example the designation of the following copying mode:

| ① | Copy number   | 3                      |
|---|---------------|------------------------|
| ② | Sheet size    | A4                     |
| ③ | Magnification | 100%                   |
| ④ | Copy density  | 6                      |
| ⑤ | Copy color    | Red                    |
| ⑥ | One/two-side  | One side to Two sides  |

In the following there will be explained the details of identification of the marking sheet and discrimination of the copying mode.

At first, a pre-scanning operation is conducted by moving the original illuminating lamp 2c for a distance of 20–30 mm, from the reference side of the original, in the scanning direction. The image data obtained by said pre-scanning operation are stored in the RAM 311 through the CCD 300 and the image processing unit 44. The CPU 314 discriminates the presence or absence of an original and whether said original is a marking sheet, by identifying the presence or absence of image data and of identification marker 501 or 502 at an image address for said marker in the image data stored in the RAM 311. If a marking sheet is identified, the CPU 314 also identifies the direction of said marking sheet, by detecting the pattern of the identification marker. For example, if the marking sheet is placed in the correct direction, there is read the marker 501 with a pattern of image data of black-white-black-white-black from the reference position side of the original. On the other hand, if the marking sheet is placed inversely, there is read the marker 502 with a pattern of white-black-white-black-white. The direction of placement of the marking sheet can therefore be identified from said pattern.

When the pre-scanning operation identifies a marking sheet and its direction, the entire marking sheet is scanned anew for reading the image data for designating the copying mode. Also in this case, the read image data are stored in the RAM 311. The CPU 314 identifies the designated copying mode, by reading the image data stored in the RAM 311 and discriminating the presence or absence of image data at specified image addresses for copying mode selection.

Also, in case the marking sheet is identified to be inversely position with respect to the reference position, based on the identifi-marker read in the pre-scanning operation, the CPU 314 accordingly identifies the copying mode designated in the marking sheet.

Figure 1:
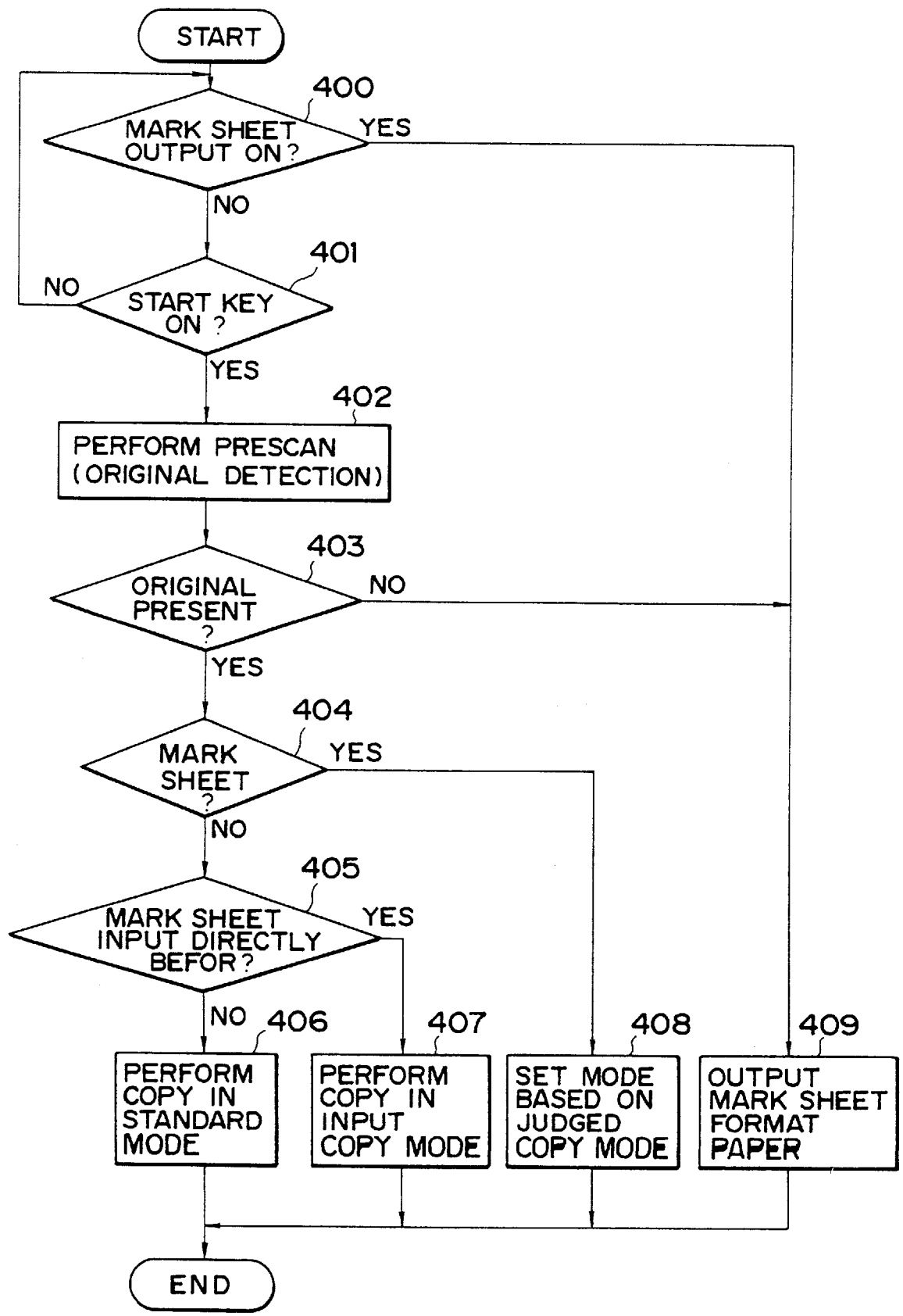
FIG. 1 is a flow chart of the control sequence of an embodiment of the image forming apparatus of the present invention.

In the following there will be explained the control sequence of the CPU 42a (or 314) of the present embodiment, with reference to a flow chart shown in FIG. 1. A control program corresponding to said control sequence is stored in advance in the ROM 42b shown in FIG. 3.

At first, when a marking sheet format output key is actuated in the operation unit 41 (step 400), the marking sheet format is printed as explained above (step 409). If said format output key is not actuated in the step 400, the sequence proceeds to a step 401, and, if a start key is actuated in the operation unit 41, a pre-scanning operation is conducted on the original, and the presence or absence of the original and its kind are discriminated from the image information obtained from the CCD line sensor 300 (step 402).

If the absence of the original is identified (step 403), the start instruction is judged for the output of a format sheet, and a marking format sheet is printed as explained before (step 409).

If the step 403 identifies the presence of an original, a next step 404 discriminates whether said original is a marking sheet, based on the presence or absence of the identification marker 501 or 502 shown in FIG. 5 If said original is identified as the marking sheet, the copying mode is identified and set, based on the image data of the marking sheet stored in the RAM 311 (step 408). In this case the copying operation is not conducted.

On the other hand, if the step 404 identifies that the original is not a marking sheet but an ordinary original document, there is discriminated whether the copying mode has been read immediately before by a marking sheet (step 405), and, if read, the original is copied with thus selected copying mode (step 407).

On the other hand, if such copy mode reading from a marking sheet has not been conducted immediately before, the copying operation is conducted with a standard mode set in advance by the operation unit 41 (step 406).

The above-explained control procedure is same also when an automatic document feeder (not shown) is employed. When said original is brought to the original reading position from the feeder, there is discriminated whether said original is a marking sheet (step 404), and, if it is a marking sheet, the copying mode is accordingly altered but the copying operation is not conducted for this original. Subsequently the copying operation is conducted with the mode set by said marking sheet, for the ensuing ordinary original documents. The above-explained operation is conducted in succession, until the absence of the originals is detected.

The steps 405, 406 and 407 in the above-explained control sequence may be conducted with the copying mode selected in advance, regardless whether a copying mode has been read immediately before from a marking sheet.

Figure 6:
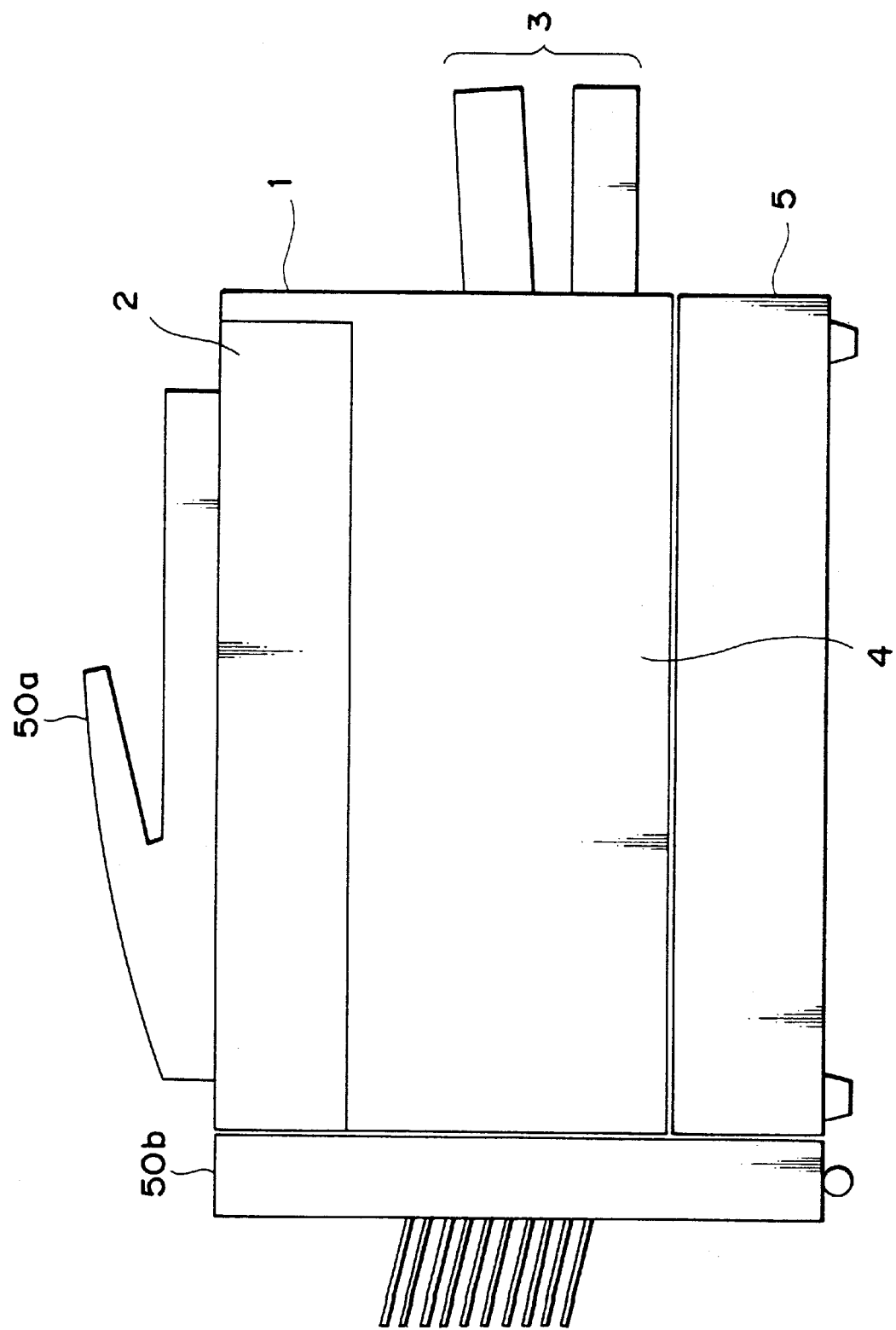
FIG. 6 is a side view of an external processing unit mounted on the image forming apparatus embodying the present invention.

FIG. 6 illustrates optional devices mounted on the main body 1, wherein 5 indicates the intermediate tray unit explained before, and 50a is a document feeder. The feeder 50a can automatically feed plural originals in succession onto the platen glass 2g of the original scanning unit, or automatically invert the original for reading both sides thereof. Thus the feeder 50a, mounted on the main body of the copying apparatus, enables two-sided copying of a two-sided original without manual labor. A sorter 50b is used for sorting and stacking the cut sheets SH subjected to image formation in the image forming unit 4. Thus said sorter 50b, mounted on the main body 1 of the copying apparatus, enables, in case of preparing plural copies from each of originals of plural pages, a sorting operation for stacking a set of copies of different pages or a collating operation for stacking copies of a same page.

Figure 7:
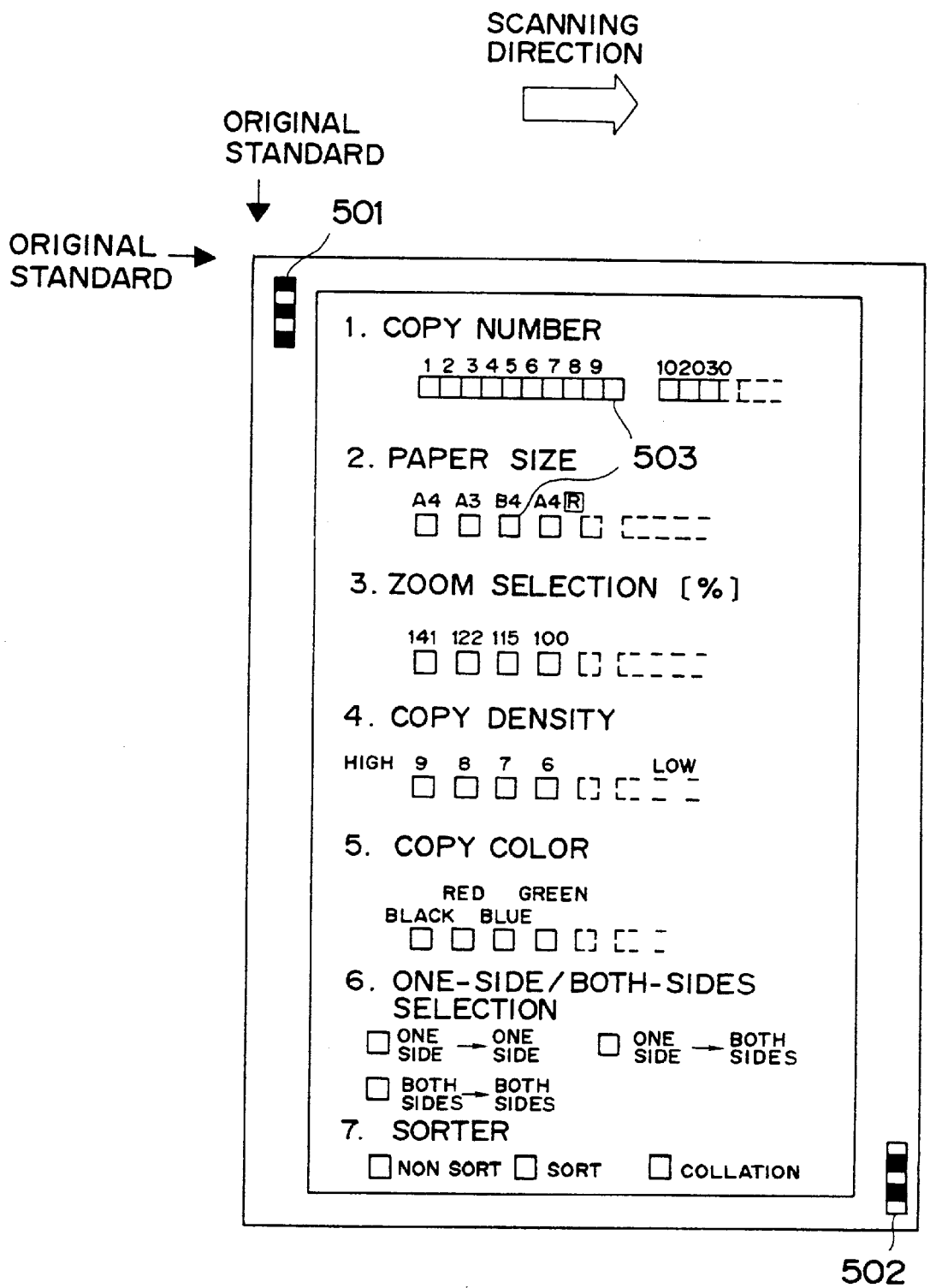
FIGS. 7 and 8 are views of the marking format sheet printed by the image forming apparatus embodying the present invention.
Figure 8:
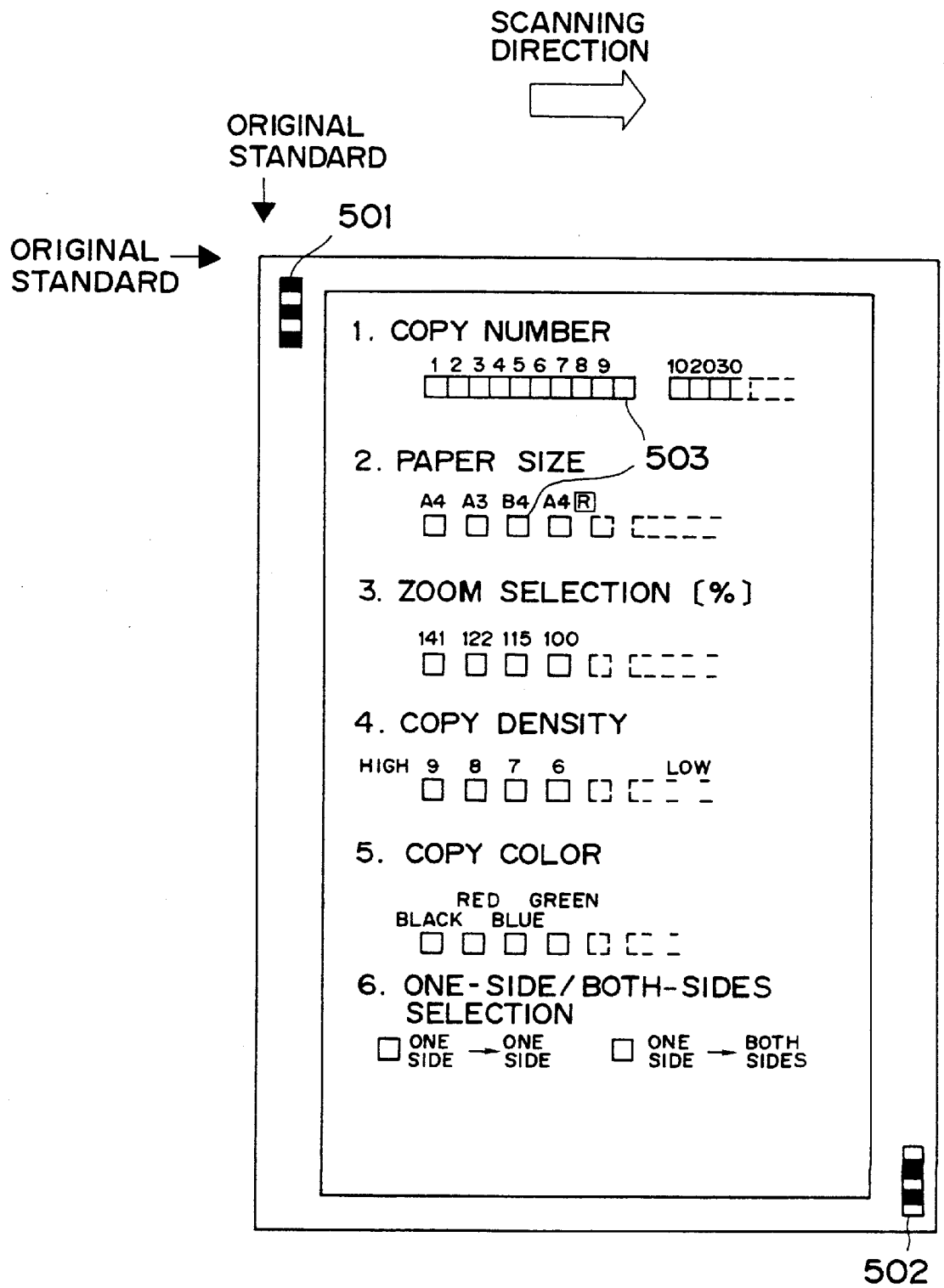

FIG. 7 shows an example of the marking sheet format printed when the optional devices (feeder 50a and sorter 50b) shown in FIG. 6 are mounted. Also FIG. 8 shows an example of the marking sheet format printed when said optional devices are not mounted. As shown in FIGS. 7 and 8, there are printed, on the cut sheet SH, the marking areas for the selectable modes according to the mounted state of the optional devices, and explanatory descriptions for such marking areas. More specifically, when the feeder 50a and the sorter 50b are mounted on the main body 1 of the copying apparatus, there can be selected the two-sided copying of two-sided original, or the sorting or collating mode as explained before, so that the main body 1 prints the marking areas for the modes executable solely by the main body 1 and those rendered selectable by the connection of the optional devices, and the explanatory descriptions for such modes, as shown in FIG. 7. On the other hand, when the feeder 50a and the sorter 50b are not mounted, the above-mentioned copying modes cannot be selected, so that the main body 1 prints, as shown in FIG. 8, the marking areas for the modes executable solely by the main body 1 and the explanatory descriptions for such marking areas.

The ROM 42b stores in advance data of the marking sheet formats respectively corresponding to a state of the main body only, a state with the feeder 50a only connected thereto, a state with the sorter 50b only connected thereto, and a state with the feeder 50a and the sorter 50b connected thereto, and the CPU 42a discriminates the connection state of said feeder 50a and sorter 50b and prints the marking sheet format by selectively reading the data of the format corresponding to thus identified connection state from the ROM 42b. It is therefore possible to prevent the user from selecting an unexecutable copying mode. Also instead of storing data of plural formats in the ROM 42b and selecting a format as explained above, it is possible to store, in the ROM 42b, the data of only a marking sheet format including the marking areas for all the modes executable when all the optional devices are connected to the main body 1 of the copying apparatus and the explanatory descriptions for said marking areas, then transferring said data to the RAM 311 and feeding white data to the portions of the marking areas for the unexecutable modes and the corresponding explanatory descriptions, thereby obtaining a marking sheet format without the unexecutable modes and the corresponding descriptions, as shown in FIG. 8.

In the foregoing embodiment, the image forming unit 4 utilizes an electrophotographic process for forming an image based on a charged image formed on a photosensitive member, but there may also be employed image forming units of various types, based for example on a bubble jet process for thermally generating bubbles in liquid ink and discharging said liquid ink by the pressure of said bubbles, or a known thermal recording process or a thermal transfer recording process.

In the following there will be explained an image forming unit utilizing the above-explained bubble jet process, with reference to FIGS. 9 and 10, which are respectively a lateral view of an image forming unit 200 and a plan view showing the structure around an ink cartridge 201 in said image forming unit 200.

An ink cartridge 201 constitutes recording means for recording an image on a recording medium 202, according to recording information. Said ink cartridge 201 integrally contains a recording head 201a and an ink tank 201b and is constructed as a disposable unit. Said recording head 201a is provided with plural liquid paths filled with liquid (ink). In the stationary state of said ink filled in said liquid paths, the surface tension and the external pressure are in equilibrium at the orifice face. Said plural liquid paths are respectively provided with electrothermal converting members, and at least a driving signal inducing a rapid temperature increase exceeding nucleus boiling is given to said electrothermal converting member to generate thermal energy, thereby gasifying the liquid ink in contact and causing film boiling. Thus a bubble is generated in the ink corresponding to said driving signal, and the ink is discharged from the orifice face to the recording medium 202 by the growth of said bubble. Said bubble subsequently shrinks by cooling with the ink, so that the ink is replenished into the liquid path from the ink tank 201b by capillary action.

As explained in the foregoing, a liquid droplet can be formed by the discharge of ink from the orifice face, by the growth or shrinkage of a bubble in the liquid path filled with ink. Thus, application of pulse-shaped driving signals to said electrothermal converting members according to the recording information causes instantaneous growth/shrinkage of bubbles, thereby discharging ink droplets from the orifice face of the recording head 201a toward the recording medium 202 and forming a record thereon. A platen 203 is provided for supporting the recording medium 202 transported to the recording unit.

Said ink cartridge 201 is mounted on a carrige 204 which can reciprocate in the main scanning direction (transversal direction of the recording medium 202) along a guide shaft 204a. Said carriage 204 is driven by a main scanning motor 205 shown in FIG. 9, through a belt 206.

A cassette 207 can contain a stack of the recording media 202, such as ordinary papers or OHP sheets, which are advanced in succession by a feed roller 208. The recording medium 202 fed by the feed roller 208 is guided by guide members 208a, 208b to reach paired transport rollers 210a, 210b, which are driven by a sub scanning motor 209 as shown in FIG. 9. At the downstream side of said transport rollers 210a, 210b, and beyond the above-mentioned recording means, there are provided paired discharge rollers 211a, 211b for discharging the recording medium 202 after recording. As shown in FIG. 9, said rollers 211a, 211b are driven by the sub scanning motor 209 through a belt 212.

Figure 9:
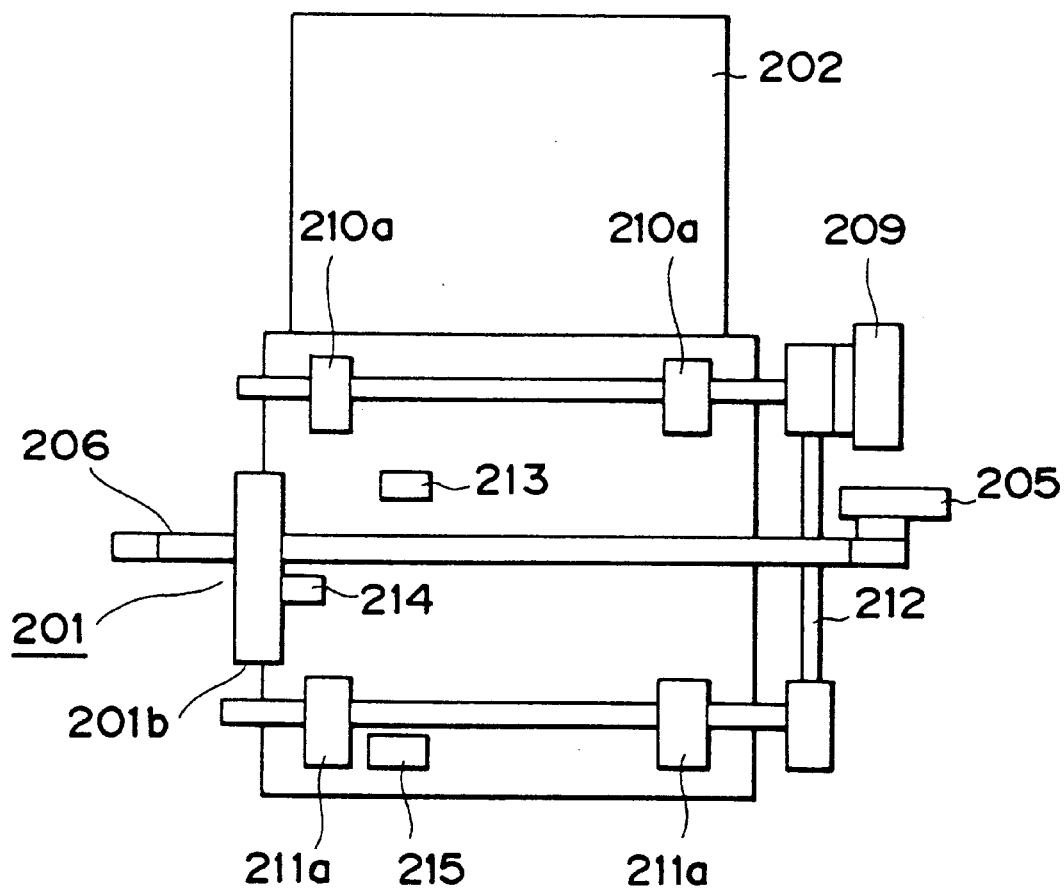
FIG. 9 is a lateral view of an image forming unit of bubble jet recording system.

Also at the downstream side of said paired transport rollers 210a, 210b there is provided, as shown in FIG. 9, a sheet sensor 213, which detects the feeding of the recording medium 202 from said cassette 207.

Said carriage 204 is also provided with a sheet width sensor 214, for identifying the kind of the recording medium 202 and the width thereof.

Also in the vicinity of the discharge rollers 211a, 211b there is provided a sheet discharge sensor 215 for detecting the discharge of the recording medium 202 after recording, and the recording medium 202 in case of feeding by manual insertion. The above-mentioned sensors are of reflective type.

Figure 10:
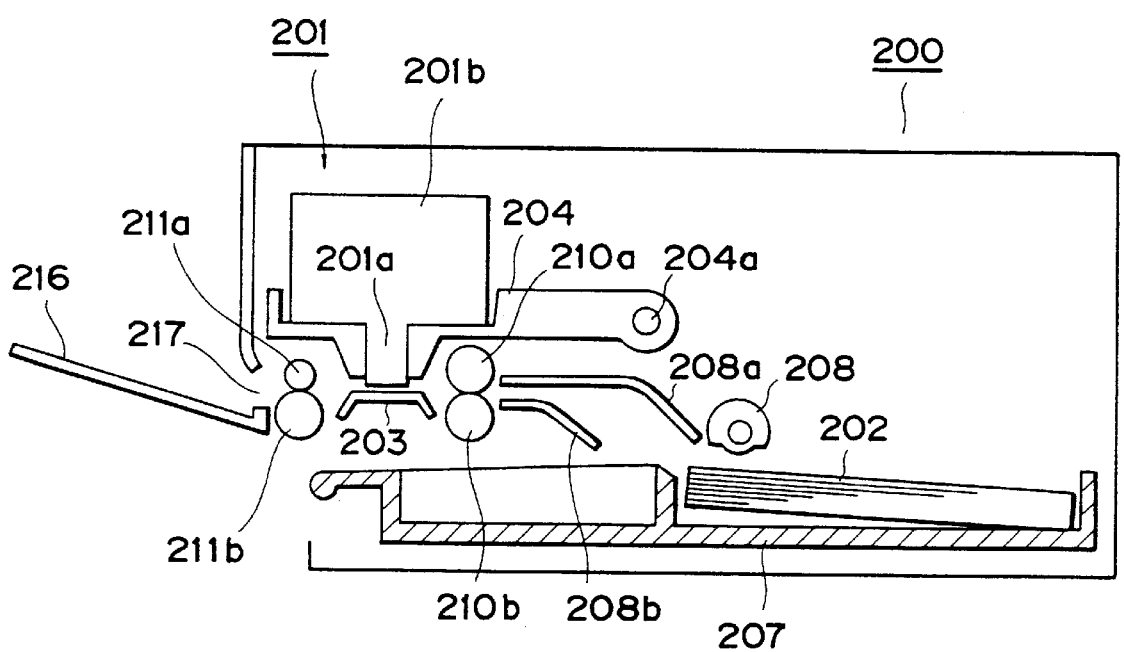
FIG. 10 is a plan view showing the structure around an ink cartridge in the image forming unit of bubble jet recording system.

In FIG. 10 there are also shown a tray 216 for stacking the recording media 202 discharged from said discharge rollers 211a, 211b, and an aperture 217 as the exit for the recording medium 202 and also as the entrance for the manually inserted recording medium.

Thus the above-explained structure allows to form an image by ink discharge according to the image information.

As explained in the foregoing, in addition to the image forming unit 4 of electrophotographic process, there may also be employed that of the bubble jet process explained above. Furthermore, the present invention is applicable, not only to a copying apparatus, but also, for example, to the designation of destination or resolving power in a facsimile apparatus. In the foregoing embodiment, the original and the marking sheet are both read by the original scanning unit 2, but there may be separately provided an original reading unit for reading the original documents and a marking sheet reading unit for exclusively reading the marking sheets. Furthermore, in the foregoing embodiment, the image forming unit 4 is used for copying the original documents and for printing the marking sheets, but there may be separately provided a copying unit for copying and a printing unit for producing the marking sheets. Also the data of the marking sheet formats, stored in a semiconductor memory in the foregoing embodiment, may also be stored in other memories such as a floppy disk or a rigid disk (hard disk).

As explained in the foregoing, the selection of image forming conditions can be made without preparation of a special format sheet in advance, since said format sheet, for marking the image forming conditions, is printed by output means when the operator starts the apparatus without the original document on the original support table or when the operator actuates a key for generating such format sheet. Also as the selection of image forming conditions by the format sheet is always possible, the buttons for selecting such image forming conditions may almost be dispensed with from the apparatus itself, and this fact contributes to the compactization, weight reduction, simplification and cost reduction of the apparatus.

The present invention is not limited to the foregoing embodiments but is subject to various modifications within the scope and spirit of the appended claims.

What is claimed is:

1. An image forming apparatus capable of image formation according to a desired image forming mode, comprising:

reader means for reading a mark sheet on which marking has already been performed, to register the image forming mode;

control means for registering the image forming mode according to image data obtained from said reader means;

memory means for storing, in advance, data representing a format of a mark sheet on which marking is not yet performed;

image forming means for reading mark-sheet format data from said memory means and effecting the image formation to obtain a mark sheet to be used in said image forming apparatus; and discrimination means for discriminating the image forming mode which is executable in said image forming apparatus, wherein said control means is adapted to cause said image forming means to form the mark sheet on which marking is not yet performed, corresponding to the result of discrimination by said discrimination means, and wherein said discrimination means discriminates whether said image forming mode is executable, based on the connection state of an external processing unit relating to said image forming mode on said image forming apparatus.

2. An apparatus according to claim 1, wherein said external processing unit is a sorter for classifying and storing the sheets subjected to image formation in said image forming apparatus.

3. An apparatus according to claim 1, wherein said reader means is adapted to read an original image, and said image forming means is adapted to effect image formation according to image data obtained by said reader means, thereby copying said original image.

4. An apparatus according to claim 3, wherein said discrimination means discriminates whether said image forming mode is executable, based on the connecting state of an external processing unit relating to said image forming mode on said image forming apparatus.

5. An apparatus according to claim 4, wherein said external processing unit is a feeder for automatically feeding said original image and said mode registration format member.

6. An apparatus according to claim 3, further comprising instruction means for starting the copying, wherein said reader means reads an original image in accordance with an instruction by said instruction means, and said image forming means performs the image formation of the original image when said reader means detects the original image, and performs the image formation of the mode registration format when said reader means does not detect the original image.

7. An apparatus according to claim 1, wherein said mode registration format has a plurality of areas for selecting the image forming mode.

8. An image forming apparatus capable of performing an image formation according to a desired image forming mode, comprising:

reading means for reading an image on an original on a platen glass;

storage means for prestoring data representing a format for registering the image forming mode;

recording means for recording the image read by said reading means onto a sheet, and recording the format in accordance with the data stored in said storage means;

discrimination means for discriminating presence or absence of the original on the platen glass;

instruction means for instructing an operation of said recording means; and control means for registering the image forming mode according to image data obtained from said reading means, wherein said control means selects, after the instruction by said instruction means, either a recording of the original image from said reading means or a recording of format image from said storage means based on a discrimination result of said discrimination means.

9. An apparatus according to claim 8, wherein said control means selects the recording of the format image from said storage means when a discrimination result of said discrimination means discriminates that the original is absent from the platen glass.

10. An apparatus according to claim 8, wherein said reading means reads the original in accordance with the instruction.

11. An apparatus according to claim 8, wherein said mode registration format includes a mark-sheet format.

12. An image forming apparatus capable of performing an image formation according to a desired image forming mode, comprising:

reading means for reading an image on an original on a platen glass;

storage means for prestoring data representing a format for registering the image forming mode;

recording means for recording the image read by said reading means onto a sheet, and recording the format in accordance with the data stored in said storage means;

discrimination means for discriminating presence or absence of the original on the platen glass;

instruction means for instructing an operation of said recording means; and control means for registering the image forming mode according to image data obtained from said reading means;

wherein said instruction means starts the copying, wherein said reading means reads an original image in accordance with an instruction by said instruction means, and said image forming means performs the image formation of the original image when said reader means detects the original image, and performs the image formation of the mode registration format when said reader means does not detect the original image, and wherein said control means selects, after the instruction by said instruction means, either a recording of the original image from said reading means or a recording of format image from said storage means based on a discrimination result of said discrimination means.

13. An apparatus according to claim 12, further comprising a signal generating unit for generating a signal for initiating the image formation in a marking sheet format, wherein said image forming means is adapted, in response to said signal from said signal generating unit, to effect image formation by reading said marking sheet format data from said memory means.

14. An apparatus according to claim 13, wherein said control means is adapted to discriminate the presence or absence of an original image according to the image data from said reader means and is adapted, in the absence of said original image, to cause said signal generating unit to generate a signal, thereby causing image formation by reading of said marking sheet format data from said memory means.

15. An apparatus according to claim 13, wherein said signal generating unit is adapted to generate a signal in response to an external input.

16. An apparatus according to claim 12, wherein said control means is adapted to discriminate whether said original image is a marking sheet, based on image data from said reader means, and, if a mode registration format member is identified, to register an image forming mode based on said image data.

17. An apparatus according to claim 12, wherein said controller is adapted not to effect said copying operation when said reader reads said marking sheet format.

18. An apparatus according to claim 12, wherein said memory medium is a semiconductor memory.

19. An apparatus according to claim 12, wherein said printer is an electrophotographic printer.

20. An apparatus according to claim 12, wherein said printer is a bubble jet printer in which bubbles are thermally generated in ink and said ink is discharged by the presence of said bubbles.

21. An apparatus according to claim 12, wherein said control means performs copying in accordance with the set mode.

22. An apparatus according to claim 12, wherein the parameters are image formation parameters.

23. An apparatus according to claim 12, wherein said mode registration format includes a mark-sheet format.

24. A method for setting an image forming apparatus into a desired image forming mode, said method comprising the steps of:

reading a mark sheet on which marking has already been performed, to register the image forming mode;

registering the image forming mode according to read image data obtained in said reading step;

storing, in advance, data representing a format of a mark sheet on which marking is not yet performed;

reading mark-sheet format data from a memory and effecting image formation to obtain a mark sheet to be used in the image forming apparatus; and discriminating the image forming mode which is executable in the image forming apparatus, wherein said registering step is adapted to cause the image forming apparatus to form the mark sheet on which marking is not yet performed, corresponding to the result of discrimination in said discriminating step, and wherein said discriminating step discriminates whether said image forming mode is executable, based on the connection state of an external processing unit relating to said image forming mode on said image forming apparatus.

25. A method according to claim 24, wherein said reading step is adapted to read an original image, and said image is adapted to effect image formation according to said read image data obtained, thereby copying said original image.

26. A method according to claim 25, wherein said discriminating step whether said image forming mode is executable, based on the connecting state of an external processing unit relating to said image forming mode on said image forming apparatus.

27. A method according to claim 26, wherein said external processing unit is a feeder for automatically feeding said original image and said mode registration format member.

28. A method according to claim 24, further comprising an instruction step for starting the copying, wherein said reading step reads an original image in accordance with an instruction by said instruction step, and an image forming step for forming the original image when said reading step detects the original image, and performs the image formation of the mode registration format when said reading means does not detect the original image.

29. A method for performing an image formation according to a desired image forming mode, the method comprising the steps of:

reading an image on an original on a platen glass;

prestoring data representing a format for registering the image forming mode;

recording the image read by said reading step onto a sheet, and recording the format in accordance with the data stored in said storing step;

discriminating a presence or an absence of the original on the platen glass;

instructing an operation of said recording step; and registering the image forming mode according to image data obtained from said reading step;

wherein said registering step selects, after the instruction by said instruction step, either a recording of the original image from said reading step or a recording of format image from said storage step based on a discrimination result of said discrimination step.

30. A method according to claim 29, wherein said registering step selects the recording of the format image from said storage step when a discrimination result of said discrimination step discriminates that the original is absent from the original stage.

31. A method according to claim 29, wherein said reading step reads the original in accordance with the instruction.

32. An apparatus according to claim 29, wherein said mode registration format includes a mark-sheet format.

33. A method for performing an image formation according to a desired image forming mode, the method comprising the steps of:

reading an image on an original on a platen glass;

prestoring the image forming mode;

recording the image read by said reading step onto a sheet, and recording the format in accordance with the data stored in said storing step;

discriminating a presence or an absence of the original on the platen glass; and instructing an operation of said recording step;

registering the image forming mode according to image data obtained from said reading step;

wherein said instruction step starts the copying, wherein said reading step reads an original image in according with an instruction by said instruction step, and an image forming step for forming the original image when said reading step detects the original image, and performs the image formation of the mode registration format when said reading step does not detect the original image, wherein said registering step selects, after the instruction by said instruction step, either a recording of the original image from said reading step or a recording of format image from said storage step based on a discrimination result of said discrimination step.

34. A method according to claim 33, further comprising a generating signal for initiating image formation in said marking sheet, wherein said forming step is adapted in response to said generated signal to effect image formation by reading said stored marking sheet format data from said memory.

35. A method according to claim 34, where in said signal generating step is adapted to generate a signal in response to an external input.

36. A method according to claim 33, wherein said marking sheet is adapted to discriminate the presence or absence of an original image according to the read image data and is adapted, in the absence of said original image, to cause said signal generating step to generate a signal, thereby causing image formation by reading of said stored marking sheet format data.

37. A method according to claim 33, wherein said designating step is adapted to discriminate whether said original image is a marking sheet, based on read image, and, if a marking sheet is identified, to register an image forming mode based on said read image data.

38. A method according to claim 33, wherein said designating step is adapted not to affect said copying operation when said reading step reads said marking sheet format.

39. A method according to claim 33, wherein said storing step stores format data in a semiconductor memory.

40. A method according to claim 33, wherein the parameters are image formation parameters.

41. An apparatus according to claim 33, wherein said mode registration format includes a mark-sheet format.

42. An image forming apparatus capable of image formation according to a desired image forming mode, comprising:

reader means for reading a mode registration format member for registering said image forming mode;

control means for registering an image forming mode according to image data obtained from said reader means;

memory means for storing, in advance, data representing said mode registration format;

image forming means for reading said mode registration format data from said memory means and effecting image formation in accordance with said mode registration data to obtain a mode registration format member to be used in said image forming apparatus; and discrimination means for discriminating a kind of an optional device connected to said image forming apparatus, wherein said image forming means forms on a member said mode registration format having a format according to a discrimination result of said discrimination means.

43. An apparatus according to claim 42, wherein the optional device includes a sorter.

44. An apparatus according to claim 42, wherein the optional device includes an original feeder.

45. An apparatus according to claim 42, wherein said image forming apparatus includes a copying machine.

46. An apparatus according to claim 42, wherein said mode registration format includes a mark-sheet format.

47. An image forming method capable of image formation according to a desired image forming mode, comprising:

a reader step of reading a mode registration format member for registering the image forming mode;

a control step of registering an image forming mode according to image data obtained in said reader step;

a storing step of storing, in advance, data representing the mode registration format;

an image forming step of reading the mode registration format data stored in said storing step and effecting image formation in accordance with the mode registration data to obtain a mode registration format member to be used in said image forming method; and a discrimination step of discriminating a kind of an optional device connected to an image forming apparatus, wherein said image forming step forms on a member the mode registration format having a format according to a discrimination result is said discrimination step.

48. A method according to claim 47, wherein the optional device includes a sorter.

49. A method according to claim 47, wherein the optional device includes an original feeder.

50. A method according to claim 47, wherein the image forming apparatus includes a copying machine.

51. A method according to claim 47, wherein the mode registration format includes a mark-sheet format.

* * * * *

UNITED STATES PATENT AND TRADEMARK OFFICE
CERTIFICATE OF CORRECTION

PATENT NO. : 5,905,581

DATED : May 18, 1999

INVENTOR : Tadashi Suzuki, et al.

It is certified that error appears in the above-identified patent and that said Letters Patent is hereby corrected as shown below:

COLUMN 3

Line 40, "28" should read --Reference number 28--; and
  Line 61, "following" should read --following description explains--.

COLUMN 5

Line 27, "on" should read --one--; and
  Line 59, "images" should read --image--.

COLUMN 6

Line 18, "once" should read --first--; and
  Line 52, "42," should read --42 is--.

COLUMN 9

Line 4, "suare" should read --square--.

COLUMN 16

Line 6, "step" should read --step discriminates--.

COLUMN 17

Line 28, "image," should read --image data,--.

UNITED STATES PATENT AND TRADEMARK OFFICE
CERTIFICATE OF CORRECTION

PATENT NO. : 5,905,581

DATED : May 18, 1999

INVENTOR : Tadashi Suzuki, et al.

It is certified that error appears in the above-identified patent and that said Letters Patent is hereby corrected as shown below:

COLUMN 18

Line 39, "is" should read --in--.

Signed and Sealed this

Thirtieth Day of May, 2000

Attest:

Attesting Officer

Q. TODD DICKINSON

Director of Patents and Trademarks